United States Patent [19]
Hassick

[11] Patent Number: 5,330,656
[45] Date of Patent: Jul. 19, 1994

[54] POLYSALT COMPOSITIONS AND THE USE THEREOF FOR TREATING AN OIL AND WATER SYSTEM

[75] Inventor: Denis E. Hassick, Monroeville, Pa.

[73] Assignee: Calgon Corporation, Pittsburgh, Pa.

[21] Appl. No.: 26,948

[22] Filed: Mar. 5, 1993

[51] Int. Cl.$^5$ .................................................. C02F 1/56
[52] U.S. Cl. ..................................... 210/708; 210/734; 210/736; 210/735; 252/328; 252/340; 252/341; 252/344; 252/345; 252/180
[58] Field of Search ............... 210/708, 734, 736, 735; 252/344, 345, 328, 340, 341, 175, 180

[56] References Cited

U.S. PATENT DOCUMENTS

| | | | |
|---|---|---|---|
| 3,493,502 | 2/1970 | Coscia | 210/736 |
| 3,585,148 | 6/1971 | Sackis | 210/708 |
| 3,855,299 | 12/1974 | Witt | 210/708 |
| 3,900,423 | 8/1975 | Markofsky | 210/708 |
| 4,120,815 | 10/1978 | Raman | 210/708 |
| 4,734,205 | 3/1988 | Jacques et al. | 210/708 |
| 5,128,046 | 7/1992 | Marble et al. | 210/708 |
| 5,192,448 | 3/1993 | Augustin et al. | 210/708 |

*Primary Examiner*—Neil McCarthy
*Attorney, Agent, or Firm*—C. G. Cochenour; W. C. Mitchell

[57] ABSTRACT

A method for treating a waste system containing an oil phase dispersed on a water phase is disclosed that includes adding a polysalt having an anionic polymer component and a cationic polymer component wherein the weight ratio of the anionic polymer component to the cationic polymer component ranges from about 5:95 to 40:60, on an active basis.

7 Claims, No Drawings

POLYSALT COMPOSITIONS AND THE USE THEREOF FOR TREATING AN OIL AND WATER SYSTEM

BACKGROUND OF THE INVENTION

1. Field of the Invention

This invention relates to polysalt compositions and methods using the polysalt compositions for treating a waste system containing oil and water.

2. Brief Description of the Background Art

Industrial activities that require the use of process oils and water create waste systems that include oil and water. These industrial activities include but are not limited to, such as for example, the automotive industry, metal parts manufacturing and machining industries, steel mills, petroleum refining operations, adhesive industries, paint industries, textile manufacturing, paper industries, sewage treatment operations, and meat and food processing plants. The mixture of the oil phase and the water phase in which either phase may be dispersed in the other is known by those skilled in the art as an emulsion. The type of oil found in the emulsion and the concentration of the oil will vary depending on the industry. For example, the oils may include animal, vegetable, mineral or synthetic oils. More specifically, these oils may include, for example, hydrocarbons such as tanins or greases, light hydrocarbons such as gasoline, lubricating oil, hydraulic pressure fluids, cutting oils, grinding fluids or animal processing oils. The concentration of the oil in the waste system may range, for example, from about 0.0001 to greater than 10% by volume.

It will be understood by those skilled in the art that the oil and water waste systems generated by industrial activity may include a wide range of various contaminants in addition to oil. Therefore, treatment of the waste system may include not only separation of the oil and water phases, but also removal of other contaminants.

A variety of chemicals have been proposed to separate a waste system into its oil and water components.

It is generally known by those skilled in the art that acids such as, for example, sulfuric acid, may be used to accomplish oil and water separation. Alternatively, polyvalent metal salts such as, for example, aluminum or iron salts are known to break oil and water emulsions. Although these acids and polyvalent, metal salts generally break oil and water emulsions, they have drawbacks, for example, the use of acids result in acidic waste water that requires neutralization, and polyvalent metal salts form high levels of hydroxide sludges that are difficult to dewater.

It is also generally well known by those skilled in the art that the use of high doses of organic cationic polymers are generally effective for separating oil and water. The organic cationic polymers include, for example, polyamines and poly dialkylammonium salts. However, these organic cationic polymers have the disadvantages of providing incomplete separations and forming moderate levels of sludge.

The use of liquid polysalts in acidic paper-making systems to improve the dry strength of paper is well known by those skilled in the arts of paper and pulp technologies. For example, U.S. Pat. No. 3,790,514 discloses a composition consisting essentially of an ionically self-crosslinked polysalt of a water soluble polyanionic polymer and a water soluble polycationic starch in a weight ratio between 95:5 and 5:95, and a water soluble ionization suppressor. This patent states that the polysalt compositions are used as strengthening agents for paper. This patent discloses that when the polysalts have reacted content of epichlorohydrin they have the property of imparting wet strength to paper in addition to dry strength. While the use of liquid polysalts, including for example polyanionic and polycationic starch compositions, have been used to enhance the dry and wet strengths of paper, no use has been made of polysalts of polyanionic and polycationic compositions for treating a waste system containing oil and water.

In spite of this background material, there remains a very real and substantial need for a polysalt composition capable of separating oil and water and an economical method for treating a waste system containing oil and water.

SUMMARY OF THE INVENTION

The present invention has met the above-described needs. The present invention provides a composition for treating a waste system containing oil and water comprising a polysalt having (a) an anionic polymer component which comprises from about 5 to 50%, by weight, of acrylic acid or methacrylic acid and from about 50 to 95%, by weight, of acrylamide or methacrylamide, and (b) a cationic polymer component selected from the group consisting of (i) a polyamine represented by formula (I)

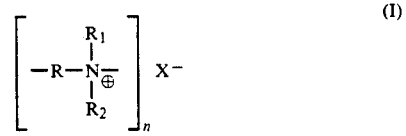

wherein $R_1$ and $R_2$ are the same or different radicals selected from the group consisting of straight or branched $C_1-C_8$ alkyl, substituted straight or branched $C_1-C_8$ alkyl, and hydrogen, wherein R is a radical selected from the group consisting of straight or branched $C_1-C_8$ alkyl and substituted straight or branched $C_1-C_8$ alkyl, and wherein n ranges from about 2 to 50,000, and (ii) $C_1-C_{12}$ dialkyl diallyl ammonium polymers. The weight ratios of the anionic polymer component of this invention to the cationic polymer component of this invention range from about 5:95 to 40:60 on an active basis. X is any halogen preferably selected from the group consisting of chlorine and bromine.

In a preferred embodiment of this invention, the composition as described herein is provided wherein the weight ratio of the anionic polymer component to the cationic polymer component is about 15:85 to 25:75, and more preferably about 20:80.

In another preferred embodiment of this invention, the composition as described herein is provided wherein the anionic polymer component comprises about 85 to 95% by weight of acrylamide and about 5 to 15% by weight of acrylic acid, and wherein the cationic polymer component is an epichlorohydrin dimethylamine polymer.

Another embodiment of this invention provides a method for treating a waste system that includes oil and water comprising introducing to the waste system an effective amount of the composition of the present invention described herein. This method further includes introducing to the waste system the anionic polymer component and the cationic polymer component of the polysalt as a single blended composition, or alternatively, independently introducing each of the anionic polymer component and the cationic polymer component of the polysalt as separate compositions to the waste system.

DETAILED DESCRIPTION OF THE INVENTION

The instant invention is directed to a composition and use thereof for treating a waste system containing oil and water.

As used herein, the term "polysalt" refers to a complex formed by charge attraction between oppositely charged polymers. Thus, polysalt compositions comprise anionic and cationic components.

As used herein, the term "active basis" means the concentration of polymer based on the solids in the stock solution.

As used herein, the term "effective amount" refers to that amount of a composition necessary to bring about a desired result, such as for example, the amount needed to achieve separation of the oil and water components of a waste system.

The present invention provides a composition for treating a waste system containing oil and water comprising a polysalt having (a) an anionic polymer component which comprises from about 5 to 50%, by weight, of acrylic acid or methacrylic acid and from about 50 to 95%, by weight, of acrylamide or methacrylamide, and salts of such polymers, and (b) a cationic polymer component selected from the group consisting of (i) a polyamine represented by formula (I)

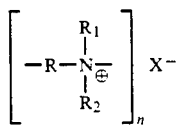

wherein $R_1$ and $R_2$ are the same or different radicals selected from the group consisting of straight or branched $C_1-C_8$ alkyl, substituted straight or branched $C_1-C_8$ alkyl and hydrogen, wherein R is a radical selected from the group consisting of straight or branched $C_1-C_8$ alkyl and substituted straight or branched $C_1-C_8$ alkyl, and wherein n ranges from about 2 to 50,000, and (ii) $C_1-C_{12}$ dialkyl diallyl ammonium polymers, wherein the weight ratio of the anionic polymer component (a) to the cationic polymer component (b) ranges from about 5:95 to 40:60, on an active basis. X is any halogen such as, for example, chlorine, bromine, fluorine or iodine. Preferably, X is a halogen selected from the group consisting of chlorine and bromine. Preferably, the weight ratio of the anionic polymer component (a) to the cationic polymer component (b) is from about 15:85 to 25:75. More preferably, the weight ratio of the anionic polymer component (a) to the cationic polymer component (b) is about 20:80. The molecular weight of the cationic polymer component of the polysalt ranges from about 5,000 to greater than 10,000,000.

The molecular weight of the anionic polymer component ranges from about 6,000 to greater than 10,000. It will be appreciated that any acrylic acid/acrylamide type polymer may be employed. Such polymers may be prepared, for example, by free radical polymerization techniques or by hydrolyzing a polyacrylamide that are well known by those skilled in the art. Further, the polymers of this invention may contain additional anionic or nonionic moieties such as, for example, sulfonic acid moieties.

In a most preferred embodiment of this invention, the cationic polymer component is a polyamine selected from the group consisting of epichlorohydrin dimethyl amine polymers. It will be appreciated that the polysalts of the instant invention are prepared by methods well known by those skilled in the art. For example, the instant polysalts may be prepared by blending aqueous solutions containing the anionic polymer component (a) and the cationic polymer component (b), respectively, and allowing charge interaction to occur.

In another embodiment of this invention, the cationic polymer component of the polysalt of the instant invention includes a polymer selected from the group consisting of $C_1-C_{12}$ dialkyl diallyl ammonium polymers. The preferred $C_1-C_{12}$ dialkyl diallyl ammonium polymers are selected from the group consisting of polydimethyl diallyl ammonium chloride, polydiethyl diallyl ammonium chloride, polydimethyl diallyl ammonium bromide, and polydiethyl diallyl ammonium bromide. The most preferred $C_1-C_{12}$ dialkyl diallyl ammonium polymer is a homopolymer of dimethyl diallyl ammonium chloride. The molecular weight of the dialkyl diallyl ammonium polymer preferably ranges from about 1,000,000 to 5,000,000, as determined by gel permeation chromatography.

It is noted that the cationic polymer component of this invention may contain one or more other met units without departing from the concept of this invention. Copolymers, terpolymers, etc., such as, for example, polymers comprising dimethyl diallyl ammonium chloride and acrylamide or diacetone acrylamide may be employed as the cationic polymer component of the polysalt of the instant invention. It will be appreciated by those skilled in the art that the ratio of met units in such copolymers generally is determined by the quantity of cationic units necessary in the polysalt formulation to impart the desired separation of the oil and water phases of the waste system. Further, additional cationic mer units may be present.

An effective amount of the polysalt of the instant invention should be employed. It will be appreciated by those skilled in the art that the dosage of the polysalt added to the waste system being treated is dependent on the oil content of the waste system. At least about 0.1 parts per million (ppm) of the polysalt should be added, based on the oil content of the waste system being treated. For example, a waste stream having an oil content ranging from about 0.5% to 1% weight/volume required generally from about 500 ppm to greater than 2200 ppm of the polysalt composition for achieving a successful separation of the oil and water phases of the waste stream. It was observed that employing amounts of the polysalt of the instant invention greater than about 2200 ppm for a waste stream of an oil-in-water emulsion having about a 0.64% weight/volume oil content provided little added benefit in terms of performance in achieving separation of the waste stream into the oil phase and the water phase.

In a preferred embodiment of this invention, the anionic polymer component of the polysalt of the instant invention comprises from about 85 to 95% by weight of acrylamide and from about 5 to 15% by weight of acrylic acid. In a most preferred embodiment of this invention, the composition includes a polysalt wherein the anionic polymer component comprises about 92.5% by weight of acrylamide and about 7.5% by weight of acrylic acid and wherein the cationic polymer is an epichlorohydrin dimethyl amine polymer.

While the compositions of the instant invention are effective in treating water and oil waste systems in which either the oil phase or water phase is dispersed in the other, it is preferable that the waste system under consideration be characterized such that the oil phase is dispersed in the water phase (i.e., continuous medium). It will be appreciated that when the instant compositions are employed to treat an oil-in-water waste system, the anionic polymer component and the cationic polymer component of the polysalt are water soluble.

The compositions of this invention are effective in waste systems having an alkaline pH or an acidic pH. Therefore, it will be understood that the pH of the waste system is believed to be unimportant as the instant compositions are effective in treating oil and water waste systems over a wide range of both alkaline and acidic waste systems. Further, the temperature of the waste system being treated is not believed to be critical.

Another embodiment of this invention provides a method for treating a waste system that includes oil and water comprising introducing to the waste system an effective amount of the composition of the instant invention as described herein. Preferably, this method includes introducing the anionic polymer component and the cationic polymer component of the polysalt to the waste system as a single blended composition. In another embodiment of this invention, the method as hereinbefore described includes adding a sufficient amount of deionized water to each of the anionic polymer component and the cationic polymer component prior to introducing the polysalt as a single blended composition to the waste system.

Alternatively, in yet another embodiment of this invention, a method is provided including independently introducing each of the anionic polymer component of the polysalt and the cationic polymer component of the polysalt as separate compositions to the waste system. Another embodiment of this invention provides a method, as hereinbefore described, that includes adding a sufficient amount of deionized water to each of the anionic polymer component and the cationic polymer component prior to introducing the anionic polymer component and the cationic polymer component as separate compositions to the waste system.

EXAMPLES

The following examples demonstrate the invention in greater detail. These examples are not intended to limit the scope of the invention in any way. In the examples, the following products were used:

AM/AA is a 21.4 weight % active acrylamide/acrylic acid copolymer available from Calgon Corporation (Pittsburgh, Pa.), comprising about 92.5% by weight of acrylamide and about 7.5% by weight of acrylic acid.

High molecular weight (MW) polyamine is a 50 weight % active epichlorohydrin dimethyl amine polymer (MW=100,000) available from Calgon Corporation as CA-260 TM.

Medium MW polyamine is a 50 weight % active epichlorohydrin dimethyl amine polymer (MW=50,000) available from Calgon Corporation as CA-250 TM.

Low MW polyamine is an epichlorohydrin dimethyl amine polymer available from American Cyanamid (Stamford, Conn.) as MAGNIFLOC® 567C.

Low MW poly DMDAAC is 30 weight % active polydimethyl diallyl ammonium chloride (MW=3,000–4,000) available from Calgon Corporation as VARIKEM TM 110.

Medium weight MW poly DMDAAC is 40 weight % active polydimethyl diallyl ammonium chloride (MW=150,000±50,000) available from Calgon Corporation as CAT-FLOC® CL.

DI H$_2$O is deionized water.

EXAMPLES 1–13

In Examples 1–13, various formulations were tested for their effectiveness in separating oil and water from a waste stream at a temperature of about 20° Centigrade. The make-up of each formulation tested is shown in Table I. The waste stream was an oil-in-water emulsion having about a 0.64% weight/volume oil content.

In each example, from about 100 to 200 milliliter (ml) samples of the waste stream were placed in a 250 ml beaker. Table II shows the amount of each formulation in parts per million (ppm) that was added to each waste stream sample. After introducing each formulation into each waste stream sample, respectively, the treated waste stream samples were then mixed. It will be understood by those skilled in the art that a variety of reproducible mixing processes may be employed at this juncture. The present investigators employed the following mixing process. After each waste stream sample was treated with one of the formulations of Examples 1–13, Table I, the treated sample was transferred into a second empty 250 ml beaker by pouring. This transfer process was repeated approximately 20 times between the two beakers to ensure thorough mixing of the composition of the respective example with the oil and water waste stream.

After the above-described mixing process was completed, the treated waste stream samples were allowed to stand from about 5 to 10 minutes. Each sample was then observed for separation of the oil and water phases.

Prior to the introduction of the formulations of Examples 1–13 to the waste stream samples as described above, each untreated waste stream sample containing oil and water was generally a milky white emulsion which did not separate on standing. A successful separation of the oil and water phases (i e., "breaking" of the oil and water emulsion) is evidenced by a change in color from the milky white color of the untreated waste stream to generally, for example, slightly cloudy to clear or a light brown color and an accompanying physical separation of the oil phase from the water phase.

TABLE I

| Example Number | Formulation | Total % Active Polymer | Weight Ratio Anionic/ Cationic Components |
|---|---|---|---|
| 1 | 60.0 g AM/AA<br>17.6 g CA 260 TM<br>22.2 g DI H$_2$O | 22 | 60/40 |
| 2 | 40.0 g AM/AA<br>26.4 g CA 260 TM<br>33.6 g DI H$_2$O | 22 | 40/60 |

TABLE I-continued

| Example Number | Formulation | Total % Active Polymer | Weight Ratio Anionic/ Cationic Components |
|---|---|---|---|
| 3 | 30.0 g AM/AA<br>30.8 g CA 260 TM<br>39.2 g DI H$_2$O | 22 | 30/70 |
| 4 | 20.0 g AM/AA<br>35.2 g CA 260 TM<br>44.8 g DI H$_2$O | 22 | 20/80 |
| 5 | 10.0 g AM/AA<br>39.6 g CA 260 TM<br>50.4 g DI H$_2$O | 22 | 10/90 |
| 6 | 5.0 g AM/AA<br>41.8 g CA 260 TM<br>53.2 g DI H$_2$O | 22 | 5/95 |
| 7 | 20.0 g AM/AA<br>34.3 g CA 250 TM<br>45.7 g DI H$_2$O | 22 | 20/80 |
| 8 | 20.0 g AM/AA<br>30.6 g MAGNIFLOC ® 567C<br>49.4 g DI H$_2$O | 22 | 20/80 |
| 9 | 20.0 g AM/AA<br>57.1 g VARIKEM TM 110<br>22.9 g DI H$_2$O | 22 | 20/80 |
| 10 | 20.0 g AM/AA .<br>42.85 g CAT-FLOC ® CL<br>37.1 g DI H$_2$O | 20 | 20/80 |
| 11 | AM/AA | 21.4 | 92.5/7.5 |
| 12 | 44 g CA 260 TM<br>66 g DI H$_2$O | 22 | 0/100 |
| 13 | 44 g CA 250 TM<br>66 g DI H$_2$O | 22 | 0/100 |

It will be understood by those skilled in the art that the deionized water was added to the example formulations to reduce viscosity. Further, the addition of deionized water allowed for the adjustment of the active basis of each composition to similar solids content so that testing was performed based on the similar amounts of active polymer. One drop of concentrated HCl was added to each formulation to increase product clarity and stability.

Table II Shows The Observed Results Of Introducing The Formulations Of Example 1-13 (Table I) As A Single Blended Addition To The Stream Sample.

Table II shows that the compositions of the instant invention, Example Nos. 2-6 and 10, produced superior results over the range of about 1000 ppm to 2200 ppm in comparison to Example Nos. 1, and 7-9 and 11-13. By varying the anionic to cationic ratio from about 40:60 to 5:95, it was found that the composition of this invention, Example No. 4, having an anionic to cationic ratio of about 20:80 produced the most preferred separation of oil and water phases of the waste stream resulting in a break of the emulsion and clear color at about 1400, 1800 and 2200 ppm.

TABLE II

| Example Number | Approximte Amount In ppm Added To Waste Stream Sample And Appearance | | | |
|---|---|---|---|---|
| | 1000 ppm | 1400 ppm | 1800 ppm | 2200 ppm |
| 1 | Partial Break<br>Cloudy | Break<br>Cloudy | Break<br>Cloudy | Break<br>Cloudy |
| 2 | Partial Break<br>Cloudy | Break<br>Slightly Cloudy | Break<br>Slightly Cloudy | Break<br>Slightly Cloudy |
| 3 | Partial Break<br>Cloudy | Break<br>Slightly Cloudy | Break<br>Slightly Cloudy | Break<br>Slightly Cloudy |
| 4 | Partial Break<br>Cloudy | Break<br>Clear | Break<br>Clear | Break<br>Clear |
| 5 | Partial Break<br>Cloudy | Break<br>Slightly Cloudy/<br>Brown | Break<br>Slightly Cloudy/<br>Brown | Break<br>Slightly Cloudy/<br>Brown |
| 6 | Partial Break<br>Cloudy | Break<br>Cloudy/Brown | Break<br>Cloudy/Brown | Break<br>Cloudy/Brown |
| 7 | Very Slight Break<br>Milky | Slight Break<br>Slightly Milky/<br>Cloudy | Slight Break<br>Slightly Milky/<br>Cloudy | Break<br>Cloudy |
| 8 | Very Slight Break<br>Milky | Slight Break<br>Slightly Milky/<br>Cloudy | Slight Break<br>Slightly Milky/<br>Cloudy | Partial Break<br>Slightly Milky/<br>Cloudy |
| 9 | Product Unstable | Product Unstable | Product Unstable | Product Unstable |
| 10 | Very Slight Break<br>Milky | Partial Break<br>Brown Color | Partial Break<br>Brown Color | Break<br>Cloudy Brown Color |
| 11 | No Break | No Break | No Break | No Break |
| 12 | Partial Break<br>Cloudy/Brown | Partial Break<br>Cloudy/Brown | Partial Break<br>Cloudy/Brown | Partial Break<br>Cloudy/Brown |
| 13 | No Break | Partial Break<br>Brown Color | Partial Break<br>Brown Color | Partial Break<br>Brown Color |

Example Nos. 7-10 employed cationic polymers having low to medium molecular weights. Table II shows that Example Nos. 7 and 8 produced generally only slight to partial separation of the oil and water phases. Table II sets forth that Example No. 9, a cationic polymer having a low molecular weight, formed an unstable product.

The results set forth in Table II for example No. 11 demonstrates that anionic compositions such as AM/AA are ineffective to break the emulsion of the waste stream sample. Clearly, the data of Table II indicates that the compositions of Example Nos. 9 and 11 are ineffective for achieving separation of oil and water waste systems.

The data of Table II clearly shows that the compositions of the present invention, Example Nos. 2-6 and 10, have improved emulsion breaking capability over known cationic compositions when used alone such as Example No. 12, having a high molecular weight, and Example No. 13, having a medium molecular weight. Table II shows that the cationic compositions of Examples Nos. 12 and 13 produced only a partial separation of the oil and water phases of the waste stream at greater than 1400 ppm and that the cationic composition of Example No. 13 did not separate the oil and water phases at 1000 ppm.

The identical above mentioned superior results were obtained for the compositions of the instant invention, Example Nos. 2-6 and 10, when either the anionic polymer component and the cationic polymer component of the polysalt were added as a single blended composition to the waste system, or when the anionic polymer component and cationic polymer component of the polysalt of the instant invention were independently introduced as separate compositions to the waste system. In the latter situation, the order of addition of the anionic polymer component and cationic polymer component was unimportant in achieving a successful break of the oil and water phases of the waste system.

Subsequent to introducing the polysalts of the instant invention to the waste system and, therefore, achieving successful separation of the oil and water phases of the emulsion of the waste stream samples, another embodiment of the present invention includes introducing to the successfully treated waste system (i.e., broken emulsion) an effective amount of a composition selected from the group consisting of a melamine formaldehyde copolymer, an aluminum salt, and an aluminum salt/cationic polymer blend, for enhancing water clarity or improving floc size.

Improvement in water clarity or floc buildup is observed when from about 1000 to 1500 ppm of an aluminum salt solution such as for example, aluminum chloride solution, or alternatively an aluminum salt solution/cationic polymer blend is added to the broken emulsion of the waste system.

Preferably, either a low solids melamine formaldehyde solution in the range of from about 500 to 2000 ppm or a high solids melamine formaldehyde solution in the range of from about 500 to 2000 ppm is introduced to the broken emulsion of the waste system to increase water clarity or floc size. Most preferably, from about 1000 to 1500 ppm high solids melamine formaldehyde solution is introduced to the treated waste system for improved water clarity or floc buildup. The melamine formaldehyde solution employed has, for example, an 8% concentration.

From the above data, therefore, it will be appreciated by those skilled in the art that the polysalt of the instant invention significantly improves the separation of oil and water in a waste system over the conventional prior art cationic compositions and anionic compositions.

Whereas particular embodiments of the instant invention have been described for purposes of illustration, it will be evident to those skilled in the art that numerous variations and details of the instant invention may be made without departing from the instant invention as defined in the appended claims.

What is claimed is:

1. A method for treating a waste system that includes an oil phase dispersed in a water phase comprising:
   introducing to said waste system an effective amount of a composition comprising a polysalt complex consisting essentially of (a) an anionic polymer component based on polymerization of a water soluble anionic monomer which consists essentially of from about 5 to 50%, by weight, of acrylic acid or methacrylic acid and from about 50 to 95%, by weight, of acrylamide or methacrylamide, and (b) a water soluble cationic polymer component selected from the group consisting of (i) a polyamine represented by formula (I)

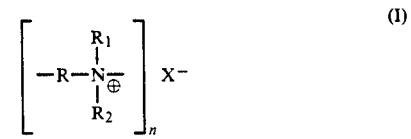

wherein $R_1$ and $R_2$ are the same or different radicals selected from the group consisting of straight or branched $C_1$-$C_8$ alkyl, substituted straight or branched $C_1$-$C_8$ alkyl and hydrogen, wherein R is a radical selected from the group consisting of straight or branched $C_1$-$C_8$ alkyl and substituted straight or branched $C_1$-$C_8$ alkyl, and wherein n ranges from about 2 to 50,000, and (ii) $C_1$-$C_{12}$ dialkyl diallyl ammonium polymers, wherein the weight ratio of said anionic polymer component (a): said cationic polymer component (b) ranges from about 5:95 to 40:60, on an active basis, and wherein X is a halogen selected from the group consisting of chlorine, bromine, fluorine and iodine, wherein said treatment provides an improvement in the separation of said oil phase and said water phase of said waste system.

2. The method of claim 1 wherein said cationic polymer component is selected from the group consisting of epichlorohydrin dimethylamine polymers.

3. The method of claim 1 wherein said cationic polymer component is said $C_1$-$C_{12}$ dialkyl diallyl ammonium polymer selected from the group consisting of polydimethyl diallyl ammonium chloride, polydiethyl diallyl ammonium chloride, polydimethyl diallyl ammonium bromide, and poly diethyl diallyl ammonium bromide.

4. The method of claim 1 wherein the weight ratio of said anionic polymer component (a): said cationic polymer component (b) is from about 15:85 to 25:75.

5. The method of claim 4 wherein the weight ratio of said anionic polymer component (a): said cationic polymer component (b) is about 20:80.

6. The method of claim 5 wherein said anionic polymer component comprises about 92.5% by weight of acrylamide and about 7.5% by weight of acrylic acid, and wherein said cationic polymer component is an epichlorohydrin dimethylamine polymer.

7. The method of claim 1 including subsequent to introducing said polysalt to said waste system, introducing to said waste system an effective amount of a composition selected from the group consisting of a melamine formaldehyde copolymer, an aluminum salt, and an aluminum salt/cationic polymer blend, for enhancing water clarity or improving floc size.

* * * * *